May 4, 1937.  J. M. UNSELD  2,079,471
TRACTION WHEEL
Filed Dec. 27, 1935   2 Sheets-Sheet 1
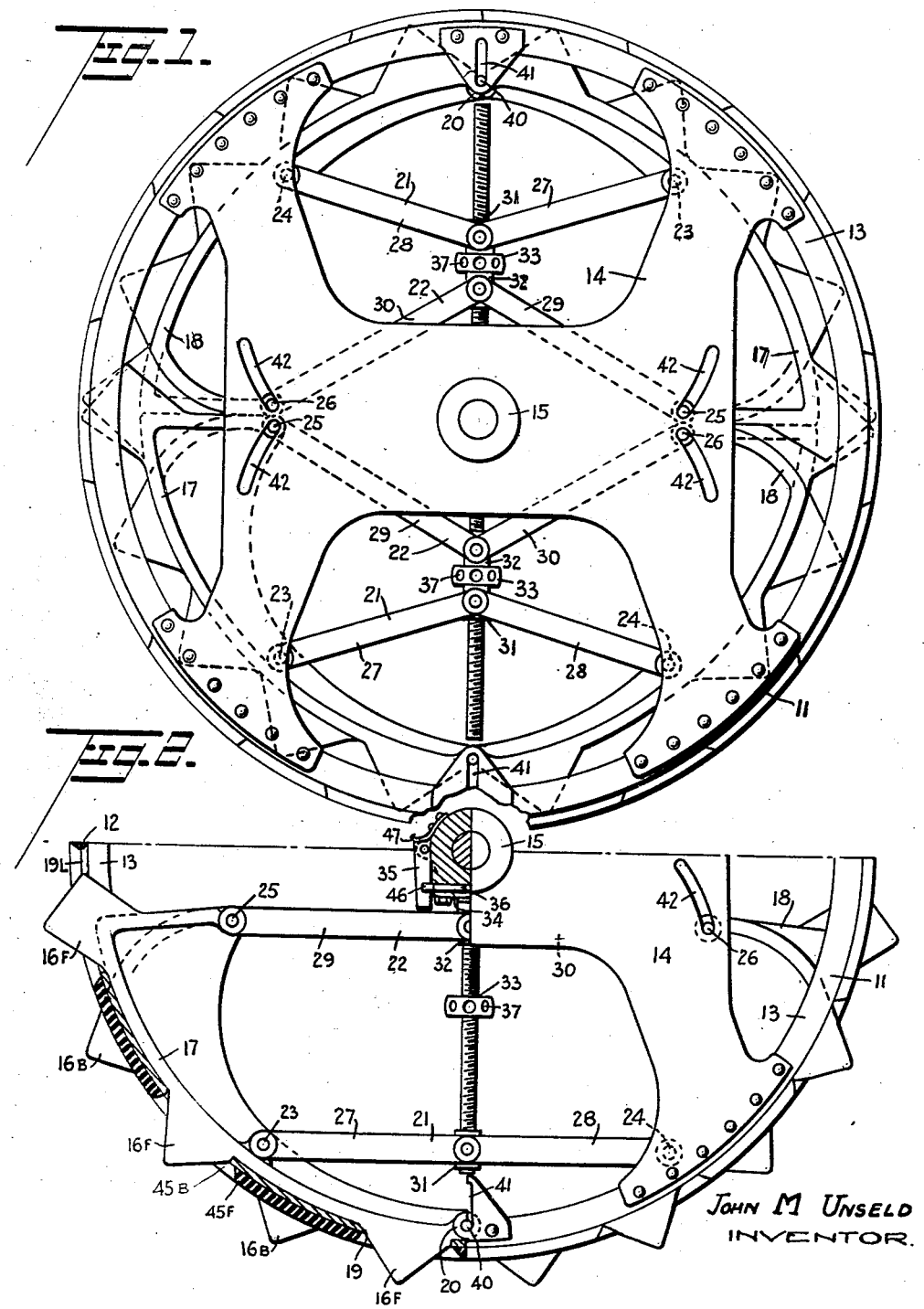
John M Unseld
INVENTOR.
BY Rudolf Hildemann
ATTORNEY.

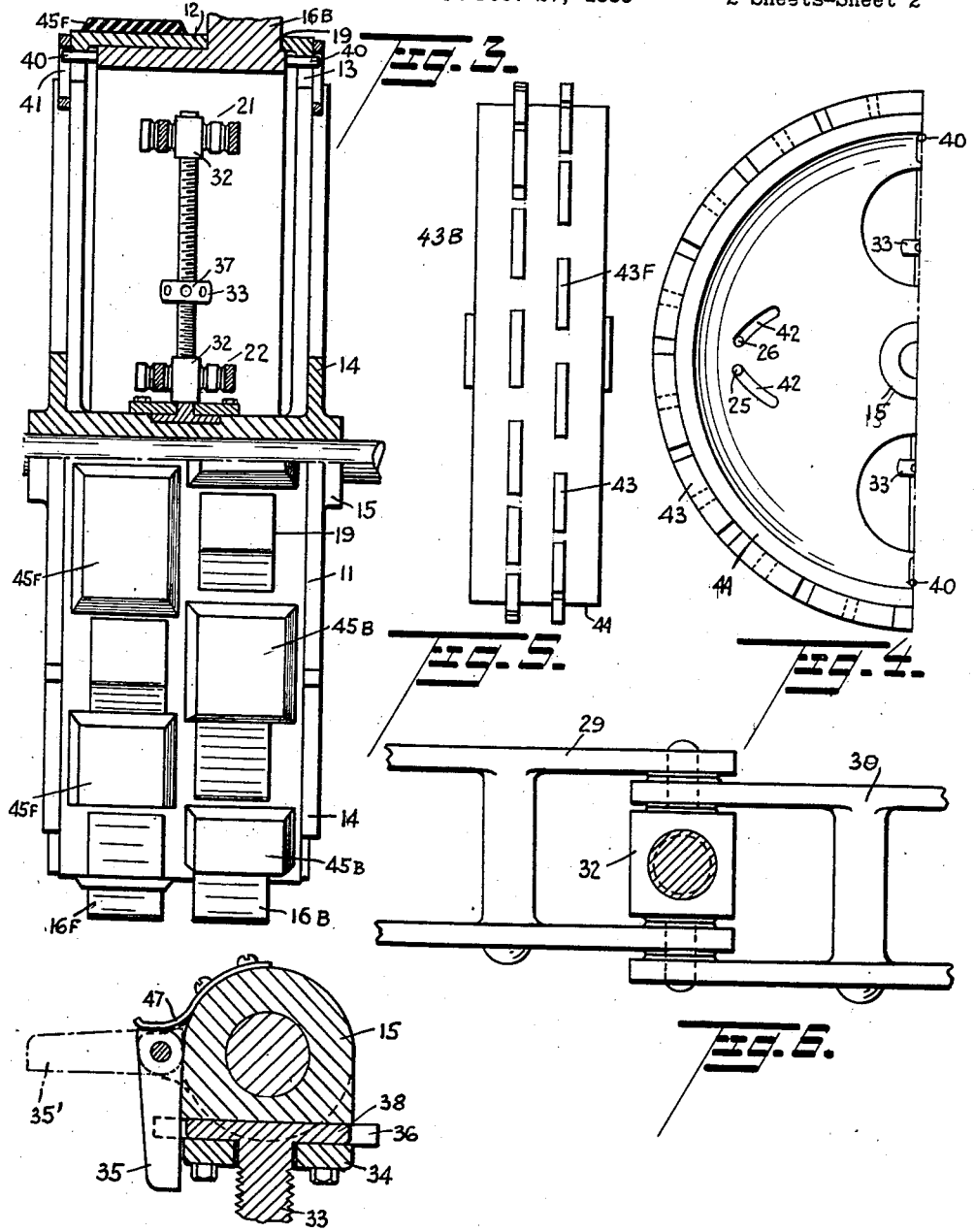

Patented May 4, 1937

2,079,471

UNITED STATES PATENT OFFICE 2,079,471

TRACTION WHEEL

John M. Unseld, Elizabeth, N. J.

Application December 27, 1935, Serial No. 56,310

11 Claims. (Cl. 301—46)

This invention relates to traction wheels, i. e. wheels which are provided with lugs in order to obtain a firm grip and/or secure guidance in soft soil, as used in tractors or other transport, war or farm implements.

The lugs protruding from the rims of wheels of this kind may either take the shape of spikes, teeth or spades in which instance they serve for gripping in propulsion or traction, or the shape of protruding rims or discs which extend longitudinally upon the periphery of the wheel, and serve to prevent skidding.

A vehicle provided with traction wheels of the kind referred to must often be transported by way of public highways to a point of utilization; but the lugs make riding in such vehicles on hard roads extremely uncomfortable, and in most instances the use of such traction wheels on highways is prohibited on account of the damage caused by the lugs to the highway. Therefore the wheels will have to be replaced, if the vehicle is to travel on highways, a covering rim must be extended around the lugs protruding from the rim proper of the wheel, filler lugs (e. g. of rubber) have to be arranged between said traction or guide lugs, or the lugs have to be removed.

It is the object of this invention to retract lugs of either kind into the frame of the wheel, so that they do not protrude therefrom, when the lugs are not operative and are not desired.

In accordance with another object of this invention, the retraction of the lugs is to be simplified, so that it may be brought about at a moment's notice, without involving a delicate or intricate construction.

In accordance with a further object of this invention, the means which serves to retract or collapse the lugs into the wheel, are not to be exposed to wear, tear and shock taken up by the lugs protruding from the wheels and are not actually taxed mechanically, so that they do not have to be constructed extremely heavily. For that reason I provide levers or links and knuckles, which by themselves, as struts, serve to support the lugs in an operative position; but the means serving to shift these parts from an operative position into an inoperative position and vice versa are not subjected to the strain and stress which is in play on the lugs when the traction wheel is in operation.

Additional objects of this invention will be brought forth and better understood from the following description and the accompanying, exemplary drawings in which:

Fig. 1 is the side elevation of a traction wheel of my invention. Note that the top and bottom portions of the wheel are substantially alike. In this view the lugs are shown in a withdrawn, collapsed or retracted position.

Fig. 2 shows a corresponding partly cross-sectioned view of only the bottom portion of the said wheel of Fig. 1; but in this view, the lugs are in an operative, extended position.

Fig. 3 shows a partly sectioned front elevation of the wheel in the position of Fig. 2.

Fig. 4 shows a symmetrical half of a modified wheel in a side view. While the wheels of the preceding views are equipped with traction lugs, the lugs in this instance take the shape of longitudinal disc sectors, which serve for guiding the wheel, thus preventing skidding.

Fig. 5 shows a corresponding front view.

Fig. 6 shows a detail, end view of the knuckle and turn buckle used as struts and as operating mechanism in my invention, respectively.

Fig. 7 shows an exemplary cross-sectional detail of the hub, illustrating the arrangement of the latch for locking the turn buckle.

Similar numbers refer to similar parts throughout the various views.

The wheel proper exemplarily comprises the circular frame 11 composed of a peripheral cylindrical part 12 and reenforcing rims 13 on opposite sides thereof. The rims 13 merge into spokes 14 which in turn are suitably fastened upon a central hub 15.

These are essentially the ordinary parts of traction wheels the lugs 16 protruding from the circumference of circular frame 11. The lugs are in this case shaped as teeth, spikes or spades and are not mounted directly upon the circular frame 11, but upon sectors 17 and 18, which are curved as annuli, so that they fit into the inside of the circular frame 11, when protracted or pressed thereagainst as shown in Fig. 2. The lugs 16 are preferably firmly lodged in the correspondingly shaped openings 19 in the circular frame 11, when they are in the operative position of Fig. 2. The lugs are staggered, shown in Fig. 1 as front lugs 16F and back lugs 16B. The openings 19 are of course correspondingly offset. The last openings 19L on opposite sides are slightly larger in order to clear the respective lugs when retracted at a slant. Rubber pads 45F and 45B (front and back) may be suitably mounted on part 12 between the openings 19 and form a continuous tire since they overlap each other. Of course they come into full play only when the lugs are retracted.

The sectors are shown to extend over substantially a quadrant, and pairs thereof are hinged together, e. g. sector 17 is connected with sector 18 by hinge 20. The free ends of these sectors are slightly elongated or are spaced out, in accordance with the spacing of the lugs to be supported thereby on one hand, and so that adjoining sectors clear each other in the retracted position, on the other hand.

The sector pair 17, 18 is also interconnected by links 21 and 22, which are fulcrumed at their ends upon hubs protruding from the inside of the sectors by studs 23 and 24, and 25 and 26, respectively.

Since the lugs 16 substantially fit into the respective openings 19 in the circular frame 11, the sectors are firmly lodged in the position of Fig. 2, and the lugs positively protrude therefrom through the circular frame 11, as long as the links 21 and 22 extend as straight struts from one sector to the other.

But the links 21 and 22 are not solid; each comprises a pair of forked lever arms 27 and 28, and 29 and 30, respectively, which are hinged upon nuts or knuckles 31 and 32, respectively. But these nuts or knuckles 31 and 32 are engaged upon the variously threaded opposite ends of turn buckle 33, which again is supported endwise but rotatably by a cap 34 on hub 15 of the wheel retaining the thrust head 38 at the end of turn buckle 33. Thus the links 27 and 28 and 29 and 30 are respectively aligned with each other, and are allocated in that aligned position in the wheel in accordance with the showing of Fig. 2, as long as turn buckle 33 is retained in a fixed position. This is brought about by a latch 35, which engages upon flats or in radial slots 36 in the thrust head 38 of the turn buckle, and keeps it from turning (see detail of Fig. 7, where spring 47 holds latch 35 either in a locked position or in the open position). When the turn buckle is to be rotated, the latch 35 is removed from the turn buckle, and the turn buckle then may be rotated, for instance by a rod inserted into openings 37 provided substantially centrally between the various threads upon which nuts or knckles 31 and 32 are engaged.

The nuts and knuckles 31 and 32 are of course oppositely threaded, so that they either move towards or away from each other, when turn buckle 33 is turned.

Rotating the turn buckle 33 in such fashion from its position of Fig. 2 that the nuts 31 and 32 move towards each other, they will eventually reach the position of Fig. 1, in which the knuckles are collapsed and the lugs are retracted so that they do not protrude any more from the circumference of the circular frame 11. The turn buckle may again be locked in this position, in which the lugs are inoperative, for instance by the latch 35. The upper and outer end of turn buckle 33 may be rotatably supported in the circular frame 11 (not shown), but there must be a clearance hole for the turn buckle in the sectors and more particularly at the point of the hinge 20, so that the sectors are free to collapse and to be retracted from the position of Fig. 2 into the position of Fig. 1, and to be protracted again into the position of Fig. 2 when the lugs are to be restored in their operative position. It is however well understood by those acquainted with the mechanical arts that in a simpler execution of this invention the outer link 21 may entirely be dispensed with and the upper threaded stud of turn buckle 33 may directly engage upon the stud 40 of hinge 20 or an enlarged central part thereof.

The stud 40 or hinge 20, as well as the studs 23, 24, 25 and 26 may be suitably guided in the rims 13 or in the spokes 14. Thus the stud 40 is guided by a straight slot 41 and the studs 25 and 26 are guided in curved slots 42.

The motor of a vehicle is ordinarily connected to the back wheels, and these back wheels would be formed in a manner of the traction wheel so far described. The front wheels, serving for steering, are ordinarily provided with a protruding rim or disc on tractors, which prevents skidding of these wheels when a sharp turn is taken and guides them in soft soil. In order to apply my invention to the front guide wheels I replace the disc sectors as indicated in Figs. 4 and 5. These disc sectors preferably overlap being offset in relation to each other, as sectors 43F and sectors 43B; and as lugs, they are projected and retracted in exactly the same manner as lugs 16 of the showing of the other figures; of course I do not require as many of these disc lugs as of the spade or spike lugs of the traction or propulsion wheel. The disc sectors 43 are guided in slots in the circular frame 44 in the same manner as lugs 16 were guided in the circular frame 11.

Although I have shown and described one form of embodiment of my invention in detail, yet I do not wish to be limited thereby, except as the state of the art and the appended claims may require, for it is obvious that various modifications and changes may be made in the form of embodiment of my invention, without departing from the spirit and scope thereof.

I claim:

1. In combination with a wheel and a circular rim around said wheel, sectors hinged upon each other and abuttingly fitting into said rim, lugs outwardly protruding from said sectors through openings in said rim, and means collapsibly supporting said sectors in said wheel.

2. In combination with a wheel and a circular rim around said wheel, circular sectors hinged upon each other and fitting into said rim, lugs outwardly protruding from said sectors through openings in said rim, and means collapsibly supporting said sectors in said wheel.

3. In combination with a wheel and a circular rim around said wheel, sectors having free ends and hinged upon each other and fitting into said rim, lugs outwardly protruding from said sectors through openings in said rim, and collapsible means relatively spacing apart said free ends of said sectors.

4. In combination with the rim of a wheel, sectors hinged upon each other and fitting into said rim, lugs outwardly protruding from said sectors through openings in said rim, and a knuckle and links interconnecting said sectors in pantograph fashion.

5. In combination with a wheel and an outer rim on said wheel, sectors hinged upon each other and fitting into said rim, lugs outwardly protruding from said sectors through openings in said rim, a knuckle and links interconnecting said sectors in pantograph fashion, and means adjustably positioning said knuckle in said wheel.

6. In combination with a wheel, sectors with free ends fitting into said wheel, a hinge between said sectors, lugs outwardly protruding from said sectors through openings in said wheel, and means for simultaneously substantially centripetally moving said hinge and swinging the free ends of said sectors towards each other, so that said lugs are withdrawn from a position of protruding from said wheel.

7. In combination with the rim of a wheel, a pair of sectors fitting into adjacent quadrants of said rim, a hinge between said sectors, lugs outwardly protruding from said sectors through openings in said rim, and means for simultaneously substantially centripetally moving said hinge and swinging the free ends of said sectors towards each other, so that said lugs are withdrawn from a position of protruding from said rim.

8. In combination with the rim of a wheel, sectors fitting into said rim, a hinge between said sectors, lugs outwardly protruding from said sectors through said rim, spaced openings in said frame slidably accommodating said lugs, and a knuckle with two links interconnecting a pair of said sectors, the links of said knuckle being normally in straight alignment.

9. In combination with a wheel and a rim on said wheel, sectors fitting into said rim, a hinge between said sectors, lugs outwardly protruding from said sectors through said rim, spaced openings in said frame outwardly accommodating said lugs, a knuckle, links interconnecting said knuckle with a pair of said sectors, said links being normally in straight alignment, and a turnbuckle mounted in said wheel and adjustably engaging said knuckle.

10. In combination with a wheel and a rim on said wheel, sectors fitting into said wheel, lugs protruding from said sectors through said rim, knuckles, links on said knuckles interconnecting said sectors, and turnbuckles relatively spacing said knuckles and serving relatively to move said sectors, said lugs being thus withdrawn in said wheel.

11. In combination with a wheel and an outer rim on said wheel, pairs of sectors fitting into said wheel, lugs protruding from said sectors through said rim, knuckles with links interconnecting said sectors, and turnbuckles relatively spacing said knuckles and serving relatively to move said sectors, said lugs being thus withdrawn in said rim.

JOHN M. UNSELD.